United States Patent
Steinbiss

(10) Patent No.: US 8,301,455 B2
(45) Date of Patent: Oct. 30, 2012

(54) USER IDENTIFICATION METHOD AND DEVICE

(75) Inventor: Volker Steinbiss, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 2751 days.

(21) Appl. No.: 10/499,466

(22) PCT Filed: Dec. 17, 2002

(86) PCT No.: PCT/IB02/05566
§ 371 (c)(1),
(2), (4) Date: Jun. 18, 2004

(87) PCT Pub. No.: WO03/056521
PCT Pub. Date: Jul. 10, 2003

(65) Prior Publication Data
US 2005/0021340 A1     Jan. 27, 2005

(30) Foreign Application Priority Data
Dec. 22, 2001   (DE) .................................. 101 63 814

(51) Int. Cl.
*G10L 21/00* (2006.01)
(52) U.S. Cl. ........ 704/273; 704/246; 704/247; 704/251; 704/252

(58) Field of Classification Search ............... 704/246, 704/247, 251, 252, 273
See application file for complete search history.

(56) References Cited

U.S. PATENT DOCUMENTS

| | | | |
|---|---|---|---|
| 6,219,639 B1 * | 4/2001 | Bakis et al. ................ 704/246 |
| 6,219,640 B1 * | 4/2001 | Basu et al. .................. 704/246 |
| 6,498,970 B2 * | 12/2002 | Colmenarez et al. .......... 701/36 |
| 6,567,775 B1 * | 5/2003 | Maali et al. ................ 704/231 |

\* cited by examiner

*Primary Examiner* — Leonard Saint Cyr
(74) *Attorney, Agent, or Firm* — Larry Liberchuk

(57) ABSTRACT

A user identification method is described in which, in a first identification procedure, identification data ($ID_1$) of a first type belonging to a target individual to be identified are determined and are compared with previously stored user identification data ($ND_1$) of the first type assigned to an authorized user. In addition, identification data ($ID_2$) of a second type that belong with a certain probability to the same target individual are automatically determined. After a successful confirmation of the identify of the target individual with the authorized user from the identification data ($ID_1$) of the first type, user identification data ($ND_2$) of the second type are stored for the respective authorized user using the determined identification data ($ID_2$) of the second type in order to use said data in a subsequent identification procedure. In addition, a corresponding user identification device is disclosed.

11 Claims, 1 Drawing Sheet

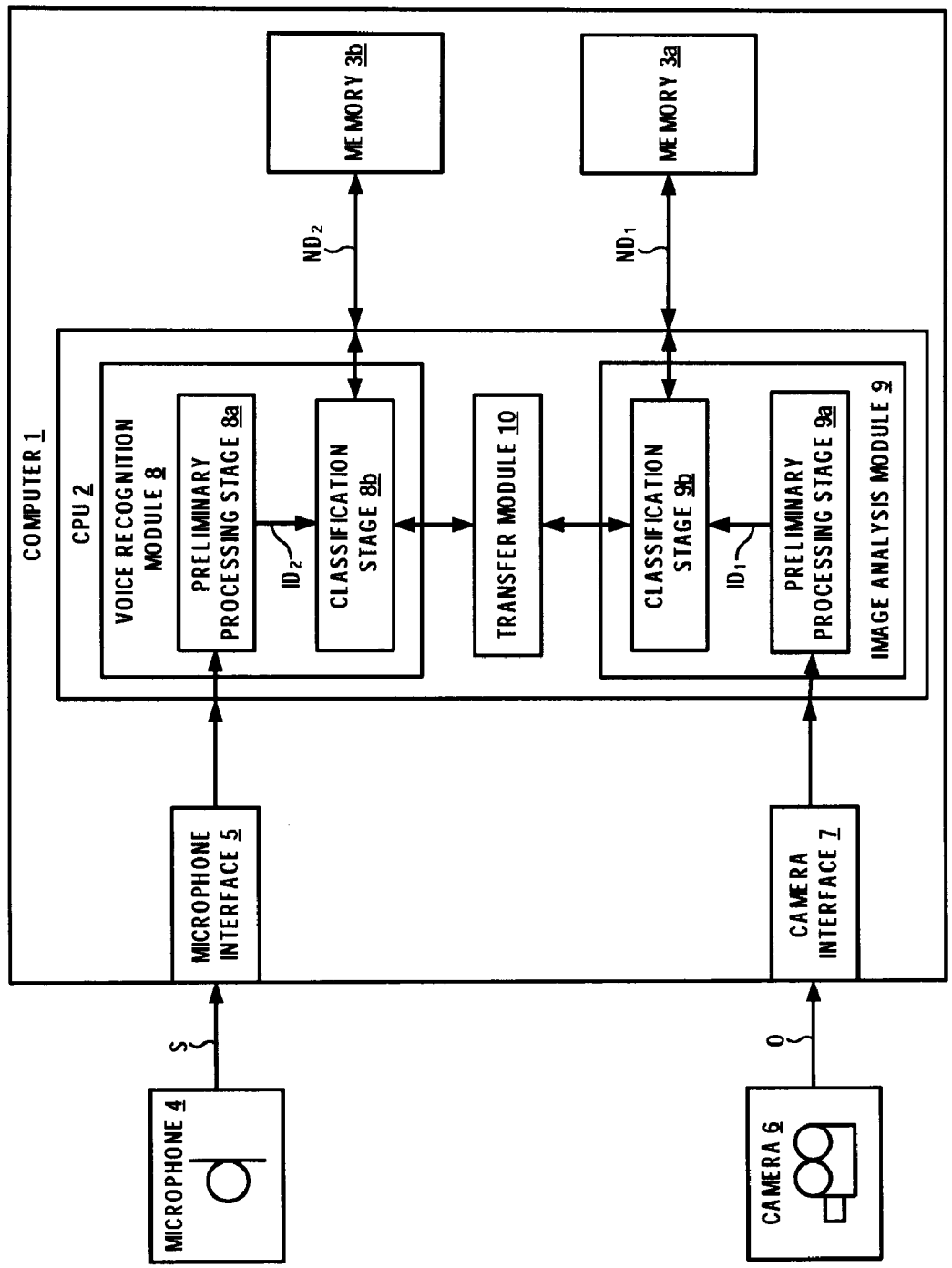

USER IDENTIFICATION METHOD AND DEVICE

The invention relates to a user identification method in which, in a first identification procedure, identification data of a first type belonging to a target individual to be identified are determined and the identification data determined of the first type are compared with previously stored user identification data of the first type assigned to an authorized user, and in which, given a coincidence present at least to a certain extent of the logged identification data with the stored user identification data, the identity of the target individual with the authorized user is established. In addition, the invention relates to a corresponding user identification device for performing such a method.

For many appliances and devices, such as, for example, automatic cash machines or other terminals, access monitoring devices, computers, mobile radios, organizers, entertainment electronics appliances, such as televisions, video recorders or DVD recorders, hi-fi systems etc., domestic appliances, telephone services or Internet services, vehicles, etc. (referred to below quite generally as service systems for short), it is desirable or possibly even necessary for the respective service system to be able to identify the user. A basic necessity for an unambiguous user identification exists, of course, in security-relevant applications, for example, in the case of automatic cash machines, in the case of access monitoring devices for security-relevant rooms or in the case of computer use with security-relevant data. In other cases, the service system can automatically adjust to the respective user with the aid of the user identification, which can appreciably increase the ease of use of the service system for the user. For example, in a car, the seat and the mirror could automatically be moved to the position suiting the respective user even as the user gets in as soon as he has been identified. In the case of a television, the channel preferred by the respective user and also the normally desired volume can automatically be preset and, for the use of an Internet browser on a PC, the personal user settings of the browser can be automatically loaded, for example a personal history that makes it possible for the user to continue a previous session or to reach certain pages rapidly that he personally prefers.

A user is frequently identified at the beginning of the use in a special identification procedure, for example if the user "logs on" into the service system. As described at the outset, identification data belonging to the target individual are determined during the identification procedure.

The identification data may, for example, be a user name and a password or a PIN, etc. However, it may also be biometric user data. Biometric data are generally understood as meaning the very varied physical attributes of a user, such as, for example, a fingerprint, a handprint, a speaker characteristic, an iris structure, the facial proportions or other biological features of any kind, such as body temperature etc. In the context of this document, however, characteristics of handwriting or the possession of a certain personalized object, for example a chip card, a mobile radio, a PDA or even a car key, etc., may also be regarded as identification data.

Depending on the type of identification data, the latter are determined by active input of the individual, for example by keying the PIN or the password into a keyboard or by evaluating user data detected visually, acoustically and/or sensorily in another way. Examples of this are the automatic evaluation of a picture of the entire user or of body parts of the user, the evaluation of a fingerprint or the evaluation of voice signals. The signals can be detected with conventional devices such as a microphone or camera. Furthermore, however, various special sensors, for example biometric sensors for detecting fingerprint data, etc. or card-reading devices operating via contact or without contact or the like are available. A further way of obtaining identification data is to analyze the user's behavior in certain situations, for example the registration of a certain type of mouse use, of keying on a touch screen or double clicking or a certain touch using a keyboard. In particular, the individual behavior features of the user at a certain input device can be used in this connection to form a user-specific behavior pattern.

As a rule, the identification procedure is relatively irritating for the respective user. In the case of security-relevant service systems, such an identification procedure is generally readily accepted since the user is thereby given the feeling that his interests are also appropriately secured by the procedure. In the case of service systems in which it is primarily of importance to increase the ease of use by the user as a result, for example, of the service system performing suitable presettings for the user after recognizing the user, the user would not, as a rule, like to acquire these ease-of-use advantages by additional identification procedures that are irritating for him. This is true, in particular, in those cases in which the service system is used by the user over a continuous, longer period of time, such as, for example, in the case of a computer, a car or a television set, etc., and in which it cannot be independently guaranteed whether the user has correctly "logged off" when he would no longer like to take advantage of the respective service system or whether, possibly, another individual is, in the mean time, using the service system legitimately or even illegitimately instead of the authorized user. In the case of such service systems, it is unavoidable that the identification procedure is also repeated at least at certain time intervals during use, an identification procedure to be performed actively by the user himself or to be supported actively being particularly irritating.

To solve this problem, U.S. Pat. No. 6,193,153 proposes for a computer a user identification method of the type mentioned at the outset in which a computer peripheral device, for example a mouse, that the user uses to input commands into the computer is connected to a biometric sensor in such a way that biometric data of the user can automatically be detected permanently or at regular intervals while the computer peripheral device is being used and, consequently, an almost continuous checking of the identity of the user by the computer is possible, without the user thereby being irritated. However, said identification method operates only if the user uses the respective peripheral device to operate the computer. When the service system is used, this limits the method to a user identification by means of the appropriate peripheral devices, i.e. via a special service system input channel. For more complex service systems, for example networked domestic electronics in which the user has various ways of communicating with the service system and must also do this in order to fully utilize the service system, this method is unsuitable.

It is therefore an object of the invention to provide a user identification method and also a user identification device that make possible, in a simple way, a user identification at any time that is not irritating even in the case of service systems with which the user can communicate via various channels.

This object is achieved in that, in the case of the user identification mentioned at the outset, identification data of a second type that belong with a certain probability to the same target individual as the identification data of the first type are additionally automatically determined, and in that, after successfully establishing the identity of the target individual with the authorized user, on the basis of the identification data of the first type for the respective authorized user, user identification data of the second type are stored using the identification data of the second type determined for use in a subsequent identification procedure that takes place optionally on the basis of identification data of the first type determined during said identification procedure and/or identification data of the second type of said target individual. The identification data of the second type can in that case be determined at any instant in time during or after the first identification procedure as soon as a suitable opportunity arises for acquiring said data (or suitable output information items for determining the data), for example when characteristic features of the individual's face are used as identification data, as soon as it is possible to take a picture of the target individual.

A corresponding user identification device for performing such a method requires, first of all, first identification data detection means for determining the identification data of a first type of the target individual to be identified and also a memory that contains the user identification data of the first type assigned to an authorized user, and a comparison device that compares the determined identification data of the first type with the stored user identification data and establishes the identify of the target individual with the authorized user in the case of a coincidence, present at least to a certain extent, of the detected identification data with the stored user identification data. After the confirmation of the identity, an appropriate output signal, for example, is then generated for the service system using the user identification device. According to the invention, the user identification device must, in addition, have second identification data detection means for automatically determining in addition identification data of a second type belonging to the same target individual. In addition, means are needed for storing appropriate user identification data of the second type after successful confirmation of the identity of the target individual with the authorized user on the basis of the identification data of the first type for the respective authorized user using the identification data of the second type detected. This may take place, for example, in the same memory in which the user identification data of the first type are also stored or, alternatively, in a separate memory.

As a result of the combination of the identification data that can be detected via an input channel with the identification data that can be detected via a second input channel, the service system is capable of confirming or checking the user identity during the subsequent communication with the user even if a new input channel is used without the user being troubled. It is therefore consequently unnecessary for the user always to communicate with the system via the same channel, but the communication path can be altered as desired, the system automatically expanding its database relating to the user or relating to his characteristic features with which the user can be identified.

That is to say, as soon as the target individual has been identified once, additional user identification data are generated, according to the invention, for further identification procedures. Under these circumstances the stored user identification database is automatically expanded by new user identification data of a further type, i.e. without a user action explicitly necessary for the purpose during the identification procedure itself or during a subsequent use of the respective service system. In this connection, the new identification data of the target individual can be detected in any desired way via any active input channel of the user identification device. Preferably, however, at least the identification data of the second type is detected via an input channel of the service system that the user or the target individual uses in any case in order, for example, to make contact with the service system itself or to control the system.

A typical example of this is the use of a PC on which the user initially identifies himself during "logging-on" by placing a finger on a fingerprint sensor. If said PC has, in addition, a camera, for example a standard "web cam", the user's face can simultaneously be detected by means of the camera while the fingerprint is being determined. Consequently, the user identification device can assume, with a certain probability, that the target individual who belongs to the face recognized in the picture corresponds to the target individual who supplies the fingerprint at the same instant in time. The system can therefore initially confirm the identity of the target individual with an authorized user on the basis of the fingerprint data and then use the picture data immediately to store corresponding user identification data. On the basis of said new user identification data, the user can then be recognized again subsequently at any time by means of the camera without the fingerprint being needed. This method may be continued as desired. Thus, for example, the user can subsequently be recognized initially by means of the picture recognition of his face and, under these circumstances, use an automatic voice recognition unit of the system, for example, to communicate with the system. As soon as the user speaks, whether the speaker is the authorized user can be confirmed, for example, via the camera. A speaker identification can simultaneously be performed in parallel for the purpose of voice recognition, i.e. a certain speaker characteristic of the user is recorded. Said speaker characteristic data can then be stored as identification data of a further type in addition to the user identification data of the type already present so that the user can then be identified, optionally, also only on the basis of his voice.

Depending on the specific execution of the method, it is possible to assume, in this connection, with a more or less great probability that the detected identification data of the second type originate from the same target individual as the identification data of the first type. Thus, for example, if the user is observed by means of a camera while inputting a code and the section of the picture of the camera is chosen in such a way that the camera detects directly, inter alia, how the respective user himself operates the keyboard, it can be assumed with a relatively high level of certainty that the identification data of the first type, i.e. the code input, and the identification data of the second type, for example the characteristic data of the face, originate from the same target individual. On the other hand, if the section of the picture is chosen in such a way that only the face is recorded, the probability is accordingly lower. The certainty is still lower if the identification data of the first and second types are recorded with a time interval, for example if the user first "logs on" at a terminal with a PIN, and a camera, that detects the face of the user and then detects the characteristic data as identification data of the second type, switches on only during operation. In that case, in the method according to the invention, it is possibly only to draw the conclusion that the identification data of the second type presumably originate from the authorized user identified in the first identification procedure.

The specific execution of the method, in particular the conditions under which an expansion, according to the invention, of the user identification database and which requires security in the process, should therefore be adapted to the specific application case.

Thus, for example, in many applications it is not at all necessary for the service system to be able to assume with a high probability that the identification data of the various types also actually belong to the authorized user. This applies, for example, for all those cases in which the user identification is intended only to serve to increase the ease of using the service system. In these cases, it is not a substantial disadvantage if the user is subsequently incorrectly identified because of an error in the expansion of the user identification database. In the worst case, this has the result that the user gains no advantage as a result of the user recognition since the service system does not automatically adjust to him in the desired way, but to another individual. On the other hand, in security-relevant applications, it is necessary to ensure that, in detecting the identification data of the second type, it can be assumed with a very high probability that said identification data belong to the same target individual as the identification data of the first type.

In a preferred embodiment of the method, in the event of an incorrect user identification, a correction is possible by erasing again in the memory the appropriate user identification data that have resulted in the incorrect identification and by recording them again on a suitable occasion or by the user identification data being appropriately overwritten immediately, if that is possible.

To check or to detect the occasion on which the incorrect identification data were presumably determined and to use this knowledge for a possible correction, in a particularly preferred embodiment, a probability value that is a measure of the probability that the identification data of the second type originate from the same target individual as the identification data of the first type is simultaneously determined during the determination of the identification data of the second type.

In this connection, various probability values can be specified as fixed values for the system, for example, for certain situations. In this connection, in the case already mentioned of monitoring a keyboard by means of a camera, a very high probability value of, for example, 99% can be assumed, whereas, for example, in a case where only the user's face is detected while he is inputting a code number into the keyboard, only a probability value of 50%, for example, is assumed. In the event of the identification data of the first type and of the second type being detected with a time interval, the probability value can also be set, for example, as a function of the time interval, i.e. the narrower the time interval is, the higher is the probability that the target individual is identical.

The probability values may also be user-dependent since various users are also known to have different reliabilities. Thus, it may happen that some users always "log off" correctly when they are no longer using the service system, whereas other users are relatively careless under these circumstances, which may result in an increase in the error rate.

These preset values can also be modified subsequently on the basis of experience that the system gains during use. Thus, for example, the probability values for a certain situation may change on the basis of the number of cases in which an identification has proved correct and the number of cases in which identification was incorrect. The user identification device is consequently capable of learning to this extent.

The identification data may in principle be any data such as the PIN number already mentioned, a code word or chip card data or the like. Preferably, the identification data of one of the types is at least biometric data of the target individual since the biometric data are necessarily always associated with the individual and can, in many cases, easily be determined even without active assistance from the individual.

Communication of the user with the service system by means of voice commands is generally particularly convenient. In this connection, it is in any case necessary for a voice recognition system to recognize certain speaker characteristics in order to use them for the recognition of voice commands, i.e. the words or sentences. Preferably, the identification data of at least one of the types comprise relevant speaker-characteristic data.

Subclaims 4 to 6 specify various ways of increasing the probability that the identification data of the first type and of the second type originate from the same target individual. In addition to the possibility mentioned in claim 4 of performing a simultaneous measurement of the identification data with different measuring devices, for example a simultaneous detection of the face with a camera and of the speech with a microphone, claim 5 provides that the identification data of the first and second types are determined in a mutually correlated manner, i.e. in a mutually related manner. A typical example of a correlated data determination is the monitoring, already mentioned, of the target individual while inputting a code word at a keyboard by means of a camera that simultaneously detects the facial characteristics of the target individual.

A particularly safe execution of a correlated method is mentioned in claim 6. Confirmation of whether the voice signals originate from the visually detected target individual is possible on the basis of the optical data obtained and the voice signals if attention is paid to the synchronicity of the lip movement of the individual detected with the camera and the voice signals during the image evaluation and during the evaluation of the speech signals.

The user identification device according to the invention is, as a rule, incorporated in the service system and is consequently, for example, a component of a computer or of a device itself or, for example, in the case of a more complex service system, part of a central unit that monitors the service system. Preferably, in that case, parts of the service system are also used as far as possible for the user identification device or vice versa. That is to say, the various identification data detection means, such as a camera, an image evaluation device, a microphone or a voice analysis device are components that are in any case also used by the service system for other purposes.

The method can basically be performed with a suitable computer program implemented on a commercial computer. It is only necessary for the computer to have suitable peripheral devices for detecting the identification data, for example a keyboard, a microphone, a camera, a sensor for fingerprints, etc., or for it to be able to access the appropriate components of the service system to which the computer is connected. In addition, of course, a memory or a memory area is needed in which the user identification data can be stored and can be retrieved at any time.

These and other aspects of the invention are apparent from and will be elucidated with reference to the embodiments described hereinafter.

The exemplary embodiment shown in the sole FIGURE is a relatively simple service system, namely a computer 1 to be operated by the user. For the sake of clarity, only some of the components most essential for the invention are shown in this connection. It goes without saying that said computer 1 has the components otherwise normally present in computers and may also have any other desired components.

Inside the computer 1, a CPU 2 is shown that performs all the computer operations. Said CPU 2 is connected to a plurality of memories 3a, 3b, in which case these may also be memory areas of a memory.

Connected to the computer 1 is, on the one hand, a microphone 4 and, on the other hand, a camera 6. For this purpose, the computer 1 has a suitable microphone interface 5 (for example, a standard sound card) that conveys the voice signals S detected by the microphone 4 in suitable digital form to the CPU 2. In the same way, the computer 1 has a camera interface 7 (for example, a standard video card) that conveys the optical signals O recorded by the camera 6 in digitized form likewise to the CPU 2.

Shown in the form of broken-line blocks and arrows inside the CPU 2 are various software modules, i.e. certain program routines, and also their combination that are needed for this embodiment of the invention.

It goes without saying, however, that other programs, in particular, of course, the operating system and also, if applicable, any further desired application programs are, in addition, installed in the computer 1.

The optical data O recorded by the camera 6 and conveyed via the camera interface 7 to the CPU 2 are fed to an image analysis module 9. In a preliminary processing stage 9a of said image analysis module 9, the picture of the user recorded by the camera 6 is analyzed for certain characteristic facial features of the user. These characteristic facial data $ID_1$ are then conveyed to a classification stage 9b of the image analysis module 9.

The classification stage 9b has access to a memory 3a that is assigned to the image analysis module 9 and in which user identification data $ND_1$ for various authorized users of the computer 1 are stored in the form of characteristic facial data. In this connection, the classification stage 9b takes on the task of a comparator device that compares the characteristic facial data $ID_1$ of the target individual arriving from the preliminary processing stage 9a of the image analysis module 9 with the characteristic facial data of the various authorized users stored in the memory 3a.

As soon as a certain coincidence exists between the currently detected characteristic facial data $ID_1$ of the preliminary processing stage 9a of the image analysis module 9 and a certain set of user identification data $ND_1$, it is assumed that the target individual detected by the camera 6 is the particular authorized user and the target individual has consequently been identified. For this purpose, a coincidence of the characteristic facial data $ID_1$ stored for the particular user with the characteristic facial data $ID_1$ of the target individual currently extracted from the optical data of the preliminary processing stage 9a of the image analysis module 9 in certain points or to a certain extent is sufficient. That is to say, a 100% coincidence of all the data is not absolutely necessary. As a rule, such a 100% coincidence is not even achievable since the face of the user may also alter with time and even result in different pictures as a result of different recording conditions such as lighting camera viewing angle, etc. Appropriate comparison methods for checking or identifying/authorizing users on the basis of biometric data are however adequately known to the person skilled in the art and will therefore not be explained further here.

The voice data S coming from the microphone 4 are analyzed in a voice recognition module 8 that detects the spoken commands. Said voice recognition module 8 also has a preliminary processing stage 8a in which the incoming voice signals S are investigated for certain speaker-characteristic data in order to extract identification data $ID_2$ of a second type in this way. Just as in the image analysis module 9, said speaker-characteristic data $ID_2$ are conveyed to a classification stage 8b of the voice recognition module S.

The classification stage 8b, in turn, has access to a memory 3b that is assigned to the voice recognition module 8 and in which user identification data $ND_2$ for various authorized users of the computer 1 are stored or can be stored in the form of user-characteristic data. If the target individual is to be identified from speaker-characteristic data on the basis of user data $ND_2$ already stored, the classification stage 8b takes on in this case the task of a comparator device that compares the speaker-characteristic data $ID_2$ of the target individual coming from the preliminary processing stage 8a of the image analysis module 9 with the speaker-characteristic data $ND_2$ of various authorized users stored in the memory 3b.

The voice recognition module 8 and the image analysis module 9 or their classification stages 8b, 9b are linked together, according to the invention via a transfer module 10 in the embodiment shown.

Said transfer module 10 receives information items from the image analysis module 9 about which user has been recognized. These may be, for example, a user number, a name or the like. The transfer module 10 may additionally receive from the voice recognition module 8 information items about whether speaker-characteristic data $ID_2$ are present therein that have been extracted from the voice signal S. In addition, the transfer module 10 can confirm from the conditions under which the respective data were obtained that the target individual from whom the speaker-characteristic data $ID_2$ determined by the voice recognition module 8 coincides with the user recognized by the image analysis module 9. In addition, a probability value can be specified for the correctness of the coincidence confirmed for the target individual with the user. Finally, the transfer module 10 arranges for the voice recognition module 9 to store the speaker-characteristic data $ID_2$ for the recognized user as user identification data $ND_2$, i.e. draw up an appropriate new user profile.

The voice recognition module 9 accordingly stores the speaker-characteristic data $ID_2$ for the user previously identified by the image recognition module 9 as user identification data $ND_2$ of the second type, possibly together with the probability value and/or more accurate further information items about the conditions of the determination of the data in the memory 3b. From said stored user identification data $ND_2$ of the second type, it is then possible, during further use of the computer by the user or even at the start of a subsequent new session, to recognize again as described above at any time, solely from the user's speech, even if the camera 6 is switched off.

In a particularly preferred embodiment, the transfer module 10 receives, on the one hand, data about the time behavior of the detected voice signal S from the voice recognition module 8 and, on the other hand, data about the lip movement of the target individual detected with the camera 6 from the image analysis module 9. In a special program routine of the transfer module 10, the respective data are compared for synchronicity. If it is found in this process-that the voice signals S match the lip movement of the target individual detected, it may be assumed with particularly high certainty that the detected data originate from the same target individual. Accordingly, the probability value for the coincidence of the target individual, which probability value is conveyed from the transfer module 10 to the voice recognition module 8, can be chosen as very high.

At this point, it is pointed out yet again that the computer shown in the FIGURE is only a simple exemplary embodiment and that the service system may be of appreciably more complicated construction. Furthermore, it is possible, of course, to vary the exemplary embodiment shown and to combine, for example, the various software modules 8, 8a, 8b, 9, 9a, 9b, 10 in a very complex main program.

In particular, it is also possible for the computer 1 to require, for example, as a first identification during "logging on", the input of a password via a keyboard. In this case, the computer would then contain a special identification module that uses as identification data of the first type the user name and the password and identifies or authenticates the user from said data by comparison with passwords and user names stored in a further memory. The information items about the recognized user can then be transferred again to the transfer module 10. At the same time, the user could then be observed via the camera 6 and, analogously to the method described above, the facial characteristics of the user could be stored as user identification data of a second type at the request of the transfer module 10. The user is then first identified during the current session solely via the camera 6. As soon as the user retrieves a program for the first time that can be controlled by means of voice commands, the speaker-characteristic data of the user are detected and stored as identification data of a third type in accordance with the method described above so that, in future, identification of the user is also possible solely by means of analyzing the voice signals.

Consequently, the user of such a system no longer has to verify his person unnecessarily often, but the system is capable of learning in that it gradually gets to know ever more characteristic features of the user via different input channels and uses them for further identification procedures.

The invention claimed is:

1. A user identification method in which, in a first identification procedure identification data ($ID_1$) of a first type belonging to a target individual to be identified are determined and the identification data ($ID_1$) determined of the first type are compared with previously stored user identification data ($ND_1$) of the first type assigned to an authorized user, and in which, given a coincidence present at least to a certain extent of the logged identification data ($ID_1$) with the stored user identification data ($ND_1$), the identity of the target individual with the authorized user is established, characterized in that identification data ($ID_2$) of a second type that belong with a certain probability to the same target individual as the identification data ($ID_1$) of the first type are additionally automatically determined, and in that, after successfully establishing the identity of the target individual with the authorized user, on the basis of the identification data ($ID_1$) of the first type for the respective authorized user, user identification data ($ND_2$) of the second type are stored using the identification data ($ID_2$) of the second type determined for use in a subsequent identification procedure that takes place optionally on the basis of identification data ($ID_1$) of the first type determined during said identification procedure and/or identification data ($ID_2$) of the second type of said target individual.

2. A method as claimed in claim 1, characterized in that the identification data ($ID_2$) of the second type are automatically determined using an input channel of a service system that the respective target individual uses and for which the target individual is identified.

3. A method as claimed in claim 1, characterized in that the identification data ($ID_1$, $ID_2$) of at least one of the types comprises biometric data of the target individual.

4. A method as claimed in claim 3, characterized in that the identification data ($ID_2$) of at least one of the types comprise speaker-characteristic data obtained from voice signals (S) of the target individual.

5. A method as claimed in claim 1, characterized in that the identification data of the first type and of the second type are detected simultaneously with different measuring devices (4, 6).

6. A method as claimed in claim 1, characterized in that the identification data ($ID_1$, $ID_2$) of the first type and of the second type are determined in a mutually correlated manner.

7. A method as claimed in claim 5, characterized in that at least the face of a speaking target individual is detected optically and voice signals (S) are simultaneously detected acoustically, and whether the voice signals (S) originate from the optically detected target individual is confirmed from the optical data (O) and the voice signals (S) obtained in this process, and the identification data ($ID_2$) of the one type comprise speaker-characteristic data and the identification data ($ID_1$) of the other type comprise data for identifying a target individual from optical features of at least one part of the target individual.

8. A method as claimed in claim 1, characterized in that during the determination of the identification data ($ID_2$) of the second type, a probability value is determined that is a measure of the probability with which the identification data ($ID_2$) of the second type belong to the same target individual as the identification data ($ID_1$) of the first type.

9. A user identification device for performing a method according to claim 1, comprising first identification detection means (6, 7, 9, 9a, 9b) for determining identification data ($ID_1$) of a first type belonging to a target individual to be determined, comprising a memory (3a) that contains user identification data ($ND_1$) of the first type assigned to an authorized user, and comprising a comparison device (9b) that compares the identification data ($ID_1$) determined of the first type with the stored user identification data ($ND_1$) and, in the case of a coincidence, present at least to a certain extent, of the detected identification data ($ID_1$) with the stored user identification data ($ND_1$), confirms the identity of the target individual with the authorized user, characterized by second identification data detection means (4, 5, 8, 8a, 8b) for determining automatically identification data ($ID_2$) of a second type belonging to the same target individual, and means (10, 8b, 3b) for storing user identification data ($ND_2$) of the second type after a successful confirmation of the identity of the target individual with the authorized user on the basis of the identification data ($ID_1$) of the first type for the respective authorized user using the detected identification data ($ID_2$) of the second type.

10. A service system comprising a user identification device according to claim 9.

11. A computer program stored on a non-transitory memory, comprising code means for executing all the steps of a method according to claim 1 if the program is executed on a computer.

* * * * *